United States Patent [19]

Gomberg

[11] Patent Number: 4,585,646
[45] Date of Patent: Apr. 29, 1986

[54] OBTAINING SILICON COMPOUNDS BY RADIATION CHEMISTRY

[76] Inventor: Henry J. Gomberg, 430 Hillspur Rd., Ann Arbor, Mich. 48105

[21] Appl. No.: 617,594

[22] Filed: Jun. 5, 1984

[51] Int. Cl.$^4$ .................................................. C01B 1/02
[52] U.S. Cl. ............................ 423/648 R; 204/157.45;
204/157.52; 423/325; 423/324; 423/341;
423/342; 423/500; 376/324
[58] Field of Search ................... 423/648 R, 325, 500,
423/579, 341, 342; 204/157.1 R, 157.1 H;
376/324

[56] References Cited

PUBLICATIONS

W. C. Schumb and A. J. Stevens, "Partial Hydrolysis of Silicon Tetrachloride", *J.A.C.S.* 69, 726, (1947).

*Primary Examiner*—John Doll
*Assistant Examiner*—Jackson Leeds
*Attorney, Agent, or Firm*—Laurence R. Brown

[57] ABSTRACT

Irradiation of a siloxane derives SiO at low temperatures and forms the basis for a closed cycle reforming the siloxane that decomposes water to produce $H_2$ and $O_2$ in the following series of reactions:

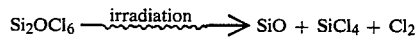

$$Si_2OCl_6 \xrightarrow{\text{irradiation}} SiO + SiCl_4 + Cl_2$$

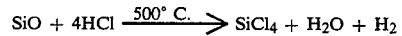

$$SiO + 4HCl \xrightarrow{500°\text{ C.}} SiCl_4 + H_2O + H_2$$

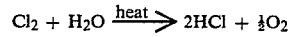

$$Cl_2 + H_2O \xrightarrow{\text{heat}} 2HCl + \tfrac{1}{2}O_2$$

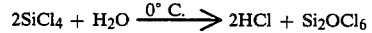

$$2SiCl_4 + H_2O \xrightarrow{0°\text{ C.}} 2HCl + Si_2OCl_6$$

8 Claims, No Drawings

OBTAINING SILICON COMPOUNDS BY RADIATION CHEMISTRY

TECHNICAL FIELD

This invention relates to derivation and separation of simpler silicon compounds by radiation chemistry from more complex silicon compounds such as the siloxanes, and more particularly it relates to chemical process cycles in which silicon compounds are irradiated in a closed cycle sequence of steps producing output hydrogen and oxygen from input water.

BACKGROUND ART

Very little is known or published regarding the irradiation of silicon compounds. It is, however, known that siloxanes can be derived by chemical reactions. Typically

The latter siloxane is known as hexachlorodisiloxane, a liquid at room temperature. However, the properties of siloxanes and silicon monoxide are little known and limited sources of supply exist. Also the dichlorosiloxane tetramer $(SiOCl_2)_4$ is known to be a solid at room temperature obtainable by the reaction

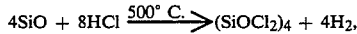

thereby providing hydrogen.

Reduction of hydrogen by decomposing water has been disclosed in a number of issued patents by use of irradiation from fusion, fission and other radiation sources. In these techniques the irradiation was in the most part of gaseous materials. It is, however, disadvantageous to construct irradiation systems of the size necessary to irradiate gaseous materials.

Thus, the employment of liquid or solid compounds is highly advantageous in an irradiation system used to derive hydrogen from water. Yet very little is known about the reactions of many such materials under irradiation and in reactions useful for derivation of hydrogen. Specifically, little is known of the characteristics of siloxane liquids and solids in the presence of irradiation.

It is also a limitation in the production of SiO, which is a desirable feed material in a hydrogen synthesis reaction, that literature describes SiO as existing only as temperatures in excess of about 1200° C. No previous method is known to synthesize SiO by low temperature reactions, which would be highly desirable.

In accordance with this invention therefore it is one objective to use silicon compounds in the synthesis of hydrogen.

It is another objective of the invention to derive a source of SiO as a desirable ingredient of processes for synthesis of hydrogen.

It is still another objective of the invention to explore the characteristics of the siloxanes, particularly in connection with cycles that can synthesize hydrogen or produce ingredients therefor such as SiO.

Other objects, features and advantages of the invention will be found throughout the following description and claims.

DISCLOSURE OF THE INVENTION

Siloxanes are irradiated at moderate temperatures such as ambient to produce silicon monoxide and other constituents such as $SiCl_4$ and chlorine, all of which are used as ingredients for a closed cycle of reactions for recovering hydrogen and oxygen from water, namely:

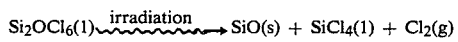

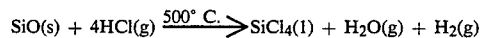

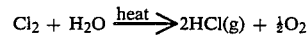

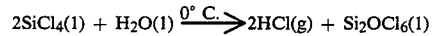

From the irradiation step therefore silicon monoxide is attained without high temperature processing. Also the $SiCl_4$ is recycled to form the basic silicone. Thus the only consumable ingredient, water, is transformed into hydrogen and oxygen.

The radiation process simplifies separation of the desired constituents by providing the output products silicon monoxide as a solid and chlorine as a gas.

THE PREFERRED EMBODIMENTS

There are several conditions desirable in a irradiation process. One is efficiency and convenience of using a reactor such as a fusion or fission reactor or a cobalt source. In this respect a liquid base material is much preferred over a gaseous material since the liquid will absorb about ten times as much radiated energy than a gas at 80 atmospheres pressure. A reduction in size of the reactor containers is most significant thereby permitting effective space use along with greater efficiency.

Furthermore, considerable energy, cost and inconvenience can be wasted in separation of the base material from constituent parts derived by irradiation. Thus, a process in which the materials are encountered in liquid, gas and solid phases will significantly simplify the harvest of desirable constituents taking on one of the phases differing from the remaining materials.

That constituent material most desirable from a complex silicon compound is silicon monoxide, since it is useful in the simple cycle for obtaining hydrogen, namely,

The prior art necessity for very high temperature treatments in derivation of silicon monoxide, however, required excessive energy and inconvenient working conditions. An ability to derive silicon monoxide at moderate temperatures thus is a distinct advantage of energy efficiency, cost and convenience.

Thus, to meet the foregoing criteria, the siloxane $Si_2OCl_6$ (hexachlorodisilocane) is irradiated in the reaction: $Si_2OCl_6(l) \rightsquigarrow SiO(s) + SiCl_4(l) + Cl_2(g)$. This provides the efficient use of radiation energy in a liquid starter material to derive silicon monoxide at ambient temperatures in a reaction that permits simple separation of the output solid phase SiO and gaseous phase $Cl_2$ from the liquid residue. A critical requirement of this reaction is to keep the reaction free from water, since the presence of water will result in SiO$_2$, an undesirable product that canot be used in the reactions of this invention, and which would seriously interfere with the harvesting of SiO.

This invention provides for a complete cycle wherein the siloxane is reconstituted and the sole input material water is decomposed into H$_2$ and O$_2$. However, the initial siloxane need be pure and dry. Thus, care in its derivation or reconstitution from the input materials is required. Thus following the reaction proposed by W. C. Schumb and A. J. Stevens in "Partial Hydrolisis of Silicon Tetrachloride", *J.A.C.S.* 69, 726 (1947) under the following conditions provides the basic siloxane to be treated in the irradiation reactions for obtaining SiO.

EXAMPLE 1

The reaction $2SiCl_4 + H_2O \rightarrow Si_2OCl_6 + 2HCl$ is carried out under the following conditions:

Four moles (679.5 grams) of SiCl$_4$ were mixed in a flask with four moles (296.5 grams) of diethyl ether —(C$_2$H$_5$)$_2$O— and cooled with a slush of carbon tetrachloride CCl$_4$ and dry ice. One mole of water (18.02 grams) was carefully added at about two drops per minute while vigorously stirring the solution with a magnetic stirrer.

After adding all the water, the HCl was evaporated by vacuum and trapping in liquid nitrogen using a rotating evaporator. Ether was removed by distillation using a Vigreaux column.

Then the flask was attached to a packed column and the SiCl$_4$ was distilled off at about 35° C. just under the boiling point at atmospheric of 57.6° C.

The Si$_2$OCl$_6$ then was distilled and collected at 133° to 135° C. (just under its boiling point of 134° to 137° C.) into a slight positive pressure of dry nitrogen gas to keep out any possible moisture. The yield as defined by the reaction depends upon the added water which was intentionally made the least abundant reactant.

EXAMPLE 2

The siloxane irradiation reaction $Si_2OCl_6(1-) \leadsto SiO(s) + SiCl_4(1) + Cl_2(g)$ in the absence of radiation or in the presence of water will produce SiO$_2$ rather than the desired SiO. Thus a pure dry source of siloxane is used.

A sample closed quartz flask of colorless liquid Si$_2$OCl$_6$ was irradiated in a fission nuclear reactor for one hour (about fifty megarad) and produced a colored liquid from which the gas (Cl$_2$) and liquids (primarily SiCl$_4$) were distilled off to leave a brown precipitate SiO.

EXAMPLE 3

The precipitate follows the reaction when heated to 500° C.: $2SiO + 4HCl \rightarrow SiCl_4 + H_2O + H_2$. The gas hydrogen is removed by fractional distillation or other known techniques and the remaining liquid (at ambient temperature) constituents SiCl$_4$ and H$_2$O are recyclable to reform the siloxane at ambient temperature.

The remaining reaction $$Cl_2 + H_2O \xrightarrow{heat} 2HCl + \tfrac{1}{2}O_2$$

is well known as the reverse deacon cycle. Thus a closed cycle for decomposing water to H$_2$ and O$_2$ is derived and a low temperature process for obtaining SiO is introduced.

Having therefore advanced the state of the art, those novel features believed descriptive of the nature and spirit of the invention are set forth with particularity in the claims.

I claim:

1. The irradiation process following the reaction $Si_2OCl_6 \leadsto SiO + SiCl_4 + Cl_2$ with radiation from a source taken from the group of cobalt, fission reactor and fusion reactor.

2. The process of claim 1 followed by separation of SiO and the reaction step of $SiO + 4HCl \rightarrow SiCl_4 + H_2 + H_2O$ at 500° C.

3. The process of claim 1 including the further step of separating SiO and processing it in the reaction $$4SiO + 8HCl \xrightarrow{500° C.} (SiOCl_2)_4 + 4H_2,$$

thereby producing hydrogen.

4. The process of claim 1 as part of the chemical cycle transforming water into H$_2$ and O$_2$ by the sequence of steps:

$$2SiCl_4 + H_2O \xrightarrow{0° C.} 2HCl + Si_2OCl_6$$

$$Si_2OCl_6 \leadsto SiO + SiCl_4 + Cl_2$$

$$SiO + 4HCl \xrightarrow{500° C.} SiCl_4 + H_2O + H_2$$

$$Cl_2 + H_2O \xrightarrow{heat} 2HCl + \tfrac{1}{2}O_2$$

5. The irradiation process following the reaction $Si_2OCl_6 \leadsto SiO + SiCl_4 + Cl_2$ with radiation from a source taken from the group of cobalt, fission reactor and fusion reactor wherein Si$_2$OCl$_6$ is in the liquid phase, SiO is in the solid phase, the SiCl$_4$ is in the liquid phase and Cl$_2$ is in the gaseous phase, including the steps of separating the solid and gaseous components respectively to derive SiO and Cl$_2$.

6. The process of claim 5 wherein the reaction is carried out at room temperature.

7. The process of claim 5 including the further step of $$SiO + 4HCl \xrightarrow{500° C.} SiCl_4 + H_2O + H_2.$$

8. The process of claim 5 carried on at ambient temperatures.

* * * * *